Sept. 20, 1932. L. L. KUETHE 1,877,902
AIRPLANE
Filed April 29, 1931 3 Sheets-Sheet 1

INVENTOR
Luvern L. Kuethe
BY
Harness, Dickey, Pierce & Hann
ATTORNEYS.

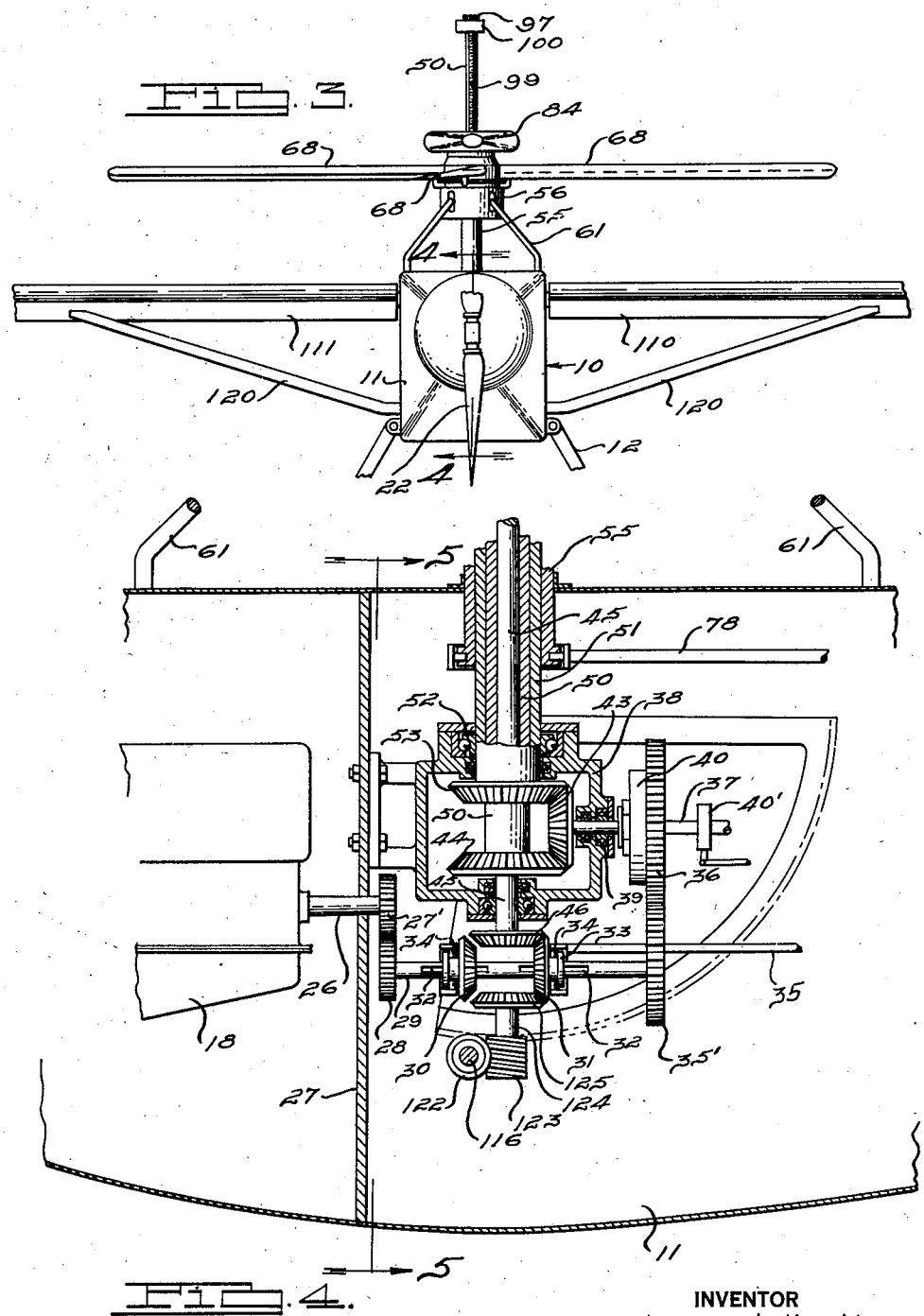

Sept. 20, 1932.   L. L. KUETHE   1,877,902
AIRPLANE
Filed April 29, 1931   3 Sheets-Sheet 3
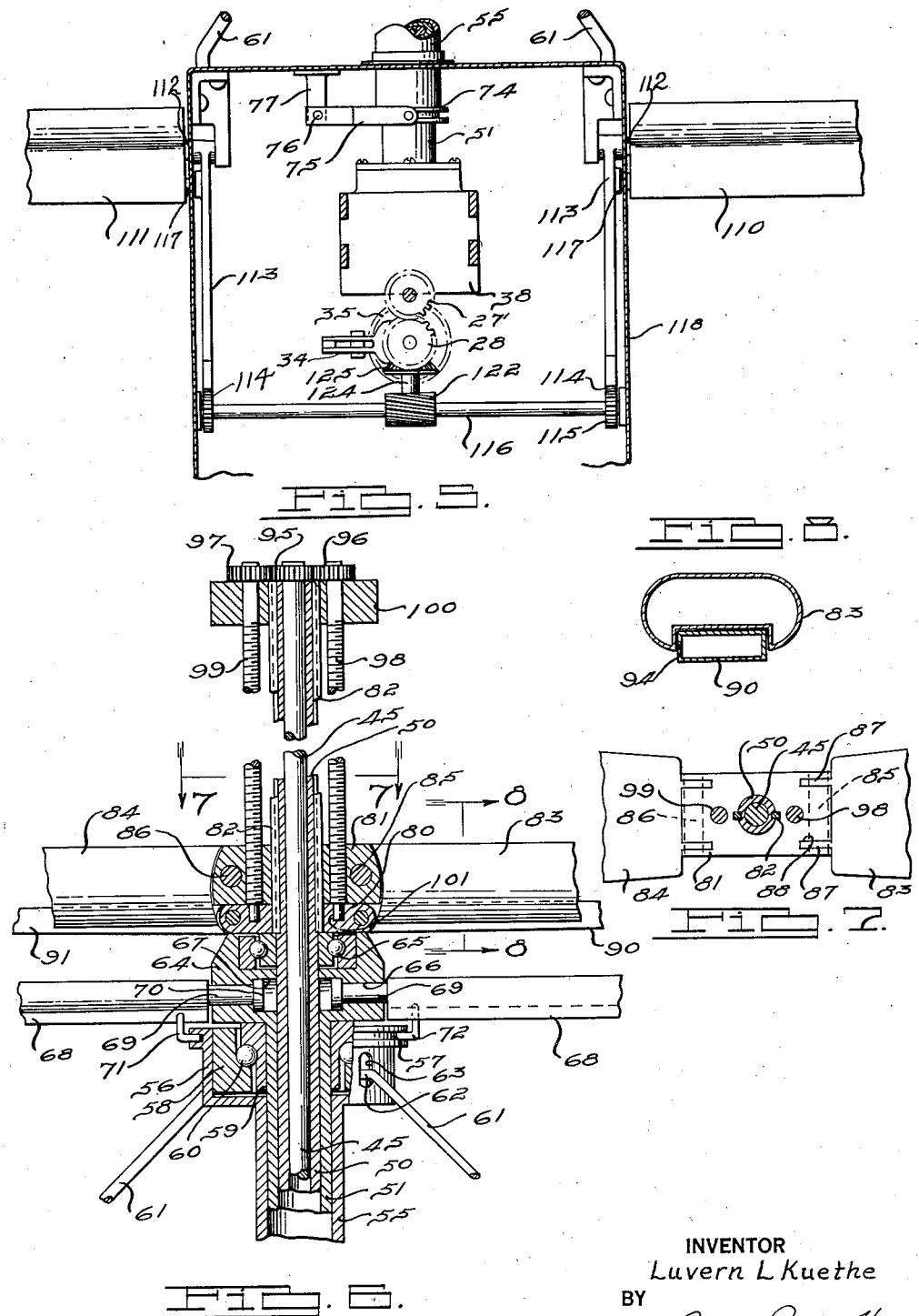
INVENTOR
Luvern L Kuethe
BY
ATTORNEYS.

UNITED STATES PATENT OFFICE

LUVERN L. KUETHE, OF ALBERT LEA, MINNESOTA

AIRPLANE

Application filed April 29, 1931. Serial No. 533,706.

The invention relates to aircraft and it has particular relation to aircraft of the heavier-than-air type.

The principal objects of the invention are to provide an airplane which may be elevated substantially in a vertical direction in the air prior to any forward movement of the plane in flight; to provide an airplane which may be brought to earth slowly and gradually, and landed upon a small ground area; to provide an airplane of such character that forward movement of the plane in landing and taking off from the ground may be prevented; to provide an airplane having main wings that may be tilted from a horizontal position toward a vertical position for the purpose of assisting in elevating the plane with respect to the ground; to provide an airplane which may be flown in a substantially vertical direction; and to provide an airplane which may be flown either horizontally or substantially vertically by an arrangement of wings and propellers operated by means of a common power plant in the plane.

For an understanding of the invention reference may be had to the accompanying drawings forming a part of the specification wherein:

Fig. 3 is a front elevational view of the construction shown by Fig. 1;

Fig. 4 is a cross-sectional view on a larger scale, taken substantially along the line 4—4 of Fig. 3;

Fig. 5 is a cross-sectional view taken substantially along the line 5—5 of Fig. 4;

Fig. 6 is a vertical cross-sectional view of the elevating propeller mechanism mounted on the upper side of the fuselage of the airplane, as shown by Fig. 2;

Fig. 7 is a cross-sectional view taken substantially along the line 7—7 of Fig. 6; and Fig. 8 is a cross-sectional view taken substantially along the line 8—8 of Fig. 6.

Figures 1, 2:
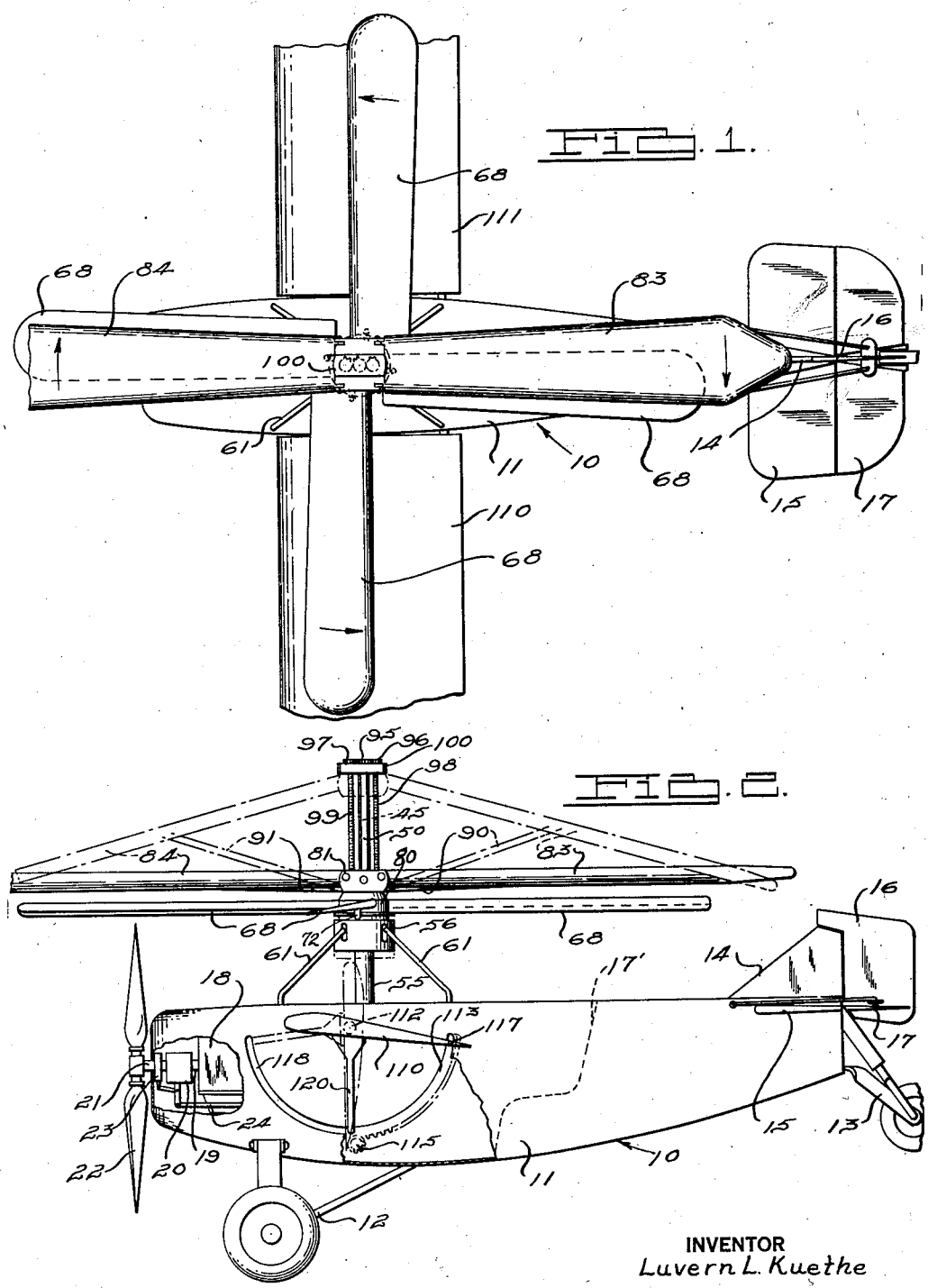
Fig. 1 is a plan view of an airplane constructed according to one form of the invention.
Fig. 2 is a side elevational view of the construction shown by Fig. 1.

Referring to Fig. 2, an airplane 10 is provided having a fuselage 11, a front landing gear 12, and a rear landing gear 13. The rear part of the fuselage 11 is provided with conventional vertical and horizontal stabilizers 14 and 15, a rudder 16, and an elevator 17. Conventional means connect the rudder 16 and elevator 17 to operating elements located in the pilot's compartment 17' of the plane. At its front end the fuselage contains a conventional power plant or motor 18 having a shaft 19 releasably connected by means of a clutch 20 to a shaft 21 supporting a vertically arranged propeller 22. A brake 23 mounted on the propeller shaft 21 is utilized for stopping the rotation of the propeller shaft when the clutch 20 is so operated that the shafts 19 and 21 are disconnected. Suitable operating means 24 connected to the clutch 20 and the brake 23 for operating these elements, extend rearwardly through the fuselage and into the pilot's compartment. In the construction shown, the operating means 24 are employed for releasing the clutch 20 and simultaneously for applying the brake 23, although it should be understood that any suitable means may be used for releasing the clutch and applying the brake and that the brake and clutch may be of any suitable character as will be readily understood by those skilled in the art.

As best shown by Fig. 4, the power plant 18 is provided with a rearwardly projecting shaft 26 that extends through a vertically disposed wall 27 in the fuselage. The speed of rotation of the shaft 26 may be governed, if this is found desirable, by means of reduction gearing interposed between the shaft and the power plant, or between the shaft and rotating parts of a mechanism which will now be described. The rear end of the shaft 26 is provided with a pinion 27' that meshes with a pinion 28 rigidly secured to a horizontally arranged shaft 29, which may be journaled in suitable bearing brackets (not shown) secured to the fuselage. Oppositely disposed bevel gears 30 and 31 are splined on the shaft 29 as indicated at 32 and each gear is provided with a collar 33 which cooperates with an operating element 34 adapted to move the bevel gear longitudinally of the shaft. Each of the operating elements 34 is connected to a rod or other suitable connecting member 35 which extends into the pilot's compartment, from which it follows that each bevel gear may be moved with respect to the shaft 29 by the pilot whenever this is necessary.

That end of shaft 29 opposite the pinion 28, is provided with a pinion 35' which meshes with a pinion 36 mounted on a shaft 37 in such manner that it may freely rotate with respect to the latter. The shaft 37 extends through one wall of a casing 38 mounted on the fuselage wall 27, and is journaled therein by means of anti-friction bearings 39. A clutch 40 splined to the shaft 37 is utilized for connecting and disconnecting the pinion 36 with respect to the shaft, and any suitable or conventional operating means extending into the pilot's compartment of the plane, may be employed for operating the clutch. Also, a conventional type of brake 40' is mounted on the shaft 37 for positively locking the latter against rotation when the clutch 40 is operated to disconnect the shaft 37 with respect to the pinion 36. At its inner end the shaft 37 is provided with a bevel gear 43 which meshes at its lower side with a bevel gear 44 rotatably mounted on a shaft 45 extending through and journaled in the lower wall of the casing 38. That end of the shaft 45 projecting beyond the lower wall of the casing 38, is provided with a bevel gear 46 positioned in proximity to the shaft 29, and is adapted selectively to engage the bevel gears 30 and 31 on the latter. The shaft 45 extends upwardly through the upper wall of the casing 38 through a vertically extending sleeve 50, and the latter in turn is enclosed by a sleeve 51. The last mentioned sleeve is journaled in the upper wall of the casing 38 by means of suitable anti-friction bearings 52. The lower end of sleeve 50 projects beyond the lower end of the sleeve 51 and is rigidly connected to the bevel gear 44 meshing with the lower side of bevel gear 43. Similarly the lower end of sleeve 51 is rigidly connected to a bevel gear 53 which meshes with the upper side of bevel gear 43.

From the foregoing description in connection with Fig. 4, it is apparent that bevel gear 46 and shaft 45 can be rotated in either direction depending upon the bevel gear 30 or 31, with which it is in mesh, while the sleeves 50 and 51 will rotate in opposite directions owing to the fact that they mesh respectively with the upper and lower sides of the bevel gear 43. Also it is apparent that the sleeves 50 and 51 may be operatively disconnected from the power plant 18 by operating the clutch 40 and that the shaft 45 may be disconnected from the power plant by disengaging both of the bevel gears 30 and 31 therefrom, or that the shaft 45 may be rotated in opposite directions by selectively engaging the bevel gears 30 and 31 with the bevel gear 46. These various operations may be controlled from the pilot's compartment in the manner previously described.

Shaft 45, and sleeves 50 and 51 project through the upper wall of the fuselage, and through a third sleeve 55 which is slidable in a vertical direction with respect to the fuselage wall. As best shown by Fig. 6, the outer sleeve 55 terminates above the fuselage, in an annular casing 56 having a grooved edge portion 57. Ball bearing races 58 and 59 having ball bearings 60 therebetween are mounted between the casing 56 and the sleeve 51 and rotatably support the latter in the casing. Supporting members 61 having their lower ends connected to the upper wall of the fuselage as shown by Figs. 4 and 5 particularly, are provided with offset upper end portions 62 that project through elongate slots 63 formed in the casing 56 and have their ends rigidly connected to the outer ball bearing race 58. Above the casing 56, the sleeve 51 terminates in a hub member 34 rotatably supported on the sleeve 50 by means of bearings 65. The hub member is provided with four equally spaced radially disposed openings 66 terminating at their inner ends in enlargements 67. Horizontally arranged propeller blades 68 are provided with shank portions at their inner ends journaled in the openings 66 which terminate in enlarged portions 70 disposed in the enlargements 67 of the openings. Each of the blades 68 can be turned about its own axis, and for effecting this result angle rod members 71 projecting freely into the groove 57 in the casing 56, are provided with vertical projections 72 connected at their upper ends to the propeller blades respectively. The point of connection of each of the projections 72 with a propeller blade, is offset laterally with respect to the axis of the latter, and consequently, when the casing 56 is moved upwardly or downwardly, the pitch of the propeller blade will be changed. Adjustment of the propeller blades in this manner is accomplished by moving the sleeve 55 vertically, which, as best shown by Figs. 4 and 5, is effected by means of a grooved collar 74 on the lower end of the sleeve which cooperates with a fork member 75 having pins projecting into the groove in the collar. The member 75 is pivoted as indicated at 76 to a bracket 77 on the fuselage, and is connected to an operating lever 78 which extends into the pilot's compartment.

Above the hub 64 on the sleeve 51, a pair of hub members 80 and 81 are splined on sleeve 50 as indicated at 82. Hub 81 is provided with a pair of propeller blades 83 and 84 diametrically disposed and longer than blades 68, which are pivoted for vertical movement on the hub as indicated at 85 and 86. Figure 7 particularly illustrates the manner of pivoting the blades 83 and 84 on the hub 81 and it will be noted that each blade is provided with a pair of eyes 87 which project into slots 88 in the outer side walls of the hub and that the pivot pins 85 project through the hub and through the eyes. Hub 80 is similarly provided with a pair of arms 90 and 91 mounted for pivotal movement in a vertical plane and the outer ends of the arms, as best shown in broken lines by Fig. 2, are pivotally connected to the intermediate portions of the blades 83 and 84 respectively. As best shown by Fig. 8, each of the blades 83 and 84 is provided with a longitudinally extending groove 94 in its lower surface which is adapted to receive one of the arms.

The shaft 45 projects slightly above the upper end of the sleeve 50 and is provided with a pinion 95 which meshes with oppositely disposed pinions 96 and 97 mounted on screws 98 and 99 projecting downwardly through and journaled in a hub member 100 keyed to the sleeve 50. The screws 98 and 99 are threaded through the hub 81 at opposite sides of the sleeve 50 and have their lower ends journaled in openings in the hub 80 as indicated at 101.

Operation of the mechanism will be understood best by referring to Figs. 2, 4 and 6. Assuming that the motor shaft 26 is rotating counter clockwise as seen from the front end of the motor, it is apparent that shaft 29 rotates clockwise, pinion 35' clockwise, pinion 36 counter clockwise, and accordingly bevel gear 43 counter clockwise. Bevel gear 44 connected to sleeve 50 then will rotate clockwise as seen from a point above the gear and accordingly propeller blades 83 and 84 will rotate clockwise as seen by Fig. 1. Bevel gear 53 connected to sleeve 51 then will rotate counter clockwise as seen from a point vertically above the gear, and, consequently propeller blades 68 secured to sleeve 51 will rotate counter clockwise as seen in Fig. 1. When propeller blades 83 and 84 are in positions as shown by Fig. 6, and bevel gear 30 is thrown into mesh with bevel gear 46 secured to shaft 45, the latter will rotate clockwise and the pinion 95 at the upper end of the shaft will impart clockwise rotation to the pinions, 96 and 97, and to the screws 98 and 99. Rotation of the screws in this manner will cause the hub member 81 to move vertically without disturbing the position of the hub member 80, and as the blades 83 and 84, secured to the hub member 81, move vertically they will be tilted about pivots 85 and 86 and be retained in tilted positions by the arms 90 and 91 which will be tilted vertically because of the pivotal connection between the outer end of the arms and the blades. The blades 83 and 84 may be tilted considerably in this manner as shown by Fig. 2. When it is desired to move the blades 83 and 84 downwardly, bevel gear 31 is thrown into mesh with bevel gear 46 which causes a reverse rotation of shaft 45 and consequently a reverse rotation of screws 98 and 99 accompanied by a downward movement of hub 81. It should be understood that bevel gears 30 and 31 are thrown into mesh with bevel gear 46 respectively, only for a time sufficient to cause the desired movement of the hub member 81. Also, it should be understood that this movement of the propeller blades 83 and 84 is effected either while the blades 83, 84 and 68 are rotating in opposite directions, or while all of the blades are stationary insofar as rotating is concerned in which event the clutch 40 will be disconnected from pinion 36 and consequently motor 18.

Rotation of the propeller blades 83, 84 and 68 in opposite directions, and particularly when blades 83 and 84 are tilted as shown by Fig. 2, provides an efficient means for elevating the airplane or landing it gradually. While the airplane is being manipulated in this manner, the clutch 20 may be thrown out, disconnecting the vertically arranged propeller 22 from the motor 18 and the propeller may be maintained stationary by application of brake 23. Preventing the propeller from rotating during elevating or lowering of the airplane, permits a substantially vertical movement of the plane and also prevents a disturbance of the air beneath the horizontally arranged propeller blades that would otherwise occur if the vertically arranged propeller blades 22 were rotating during lowering and elevating the airplane.

For further facilitating elevation of the airplane in the manner described, the latter is provided with wings 110 and 111 projecting from opposite sides of the fuselage 11 which respectively are pivoted as indicated at 112 to the side walls of the fuselage. Interiorly of the fuselage, the pivot 112 for each of the wings is connected to a segmental gear 113 having a toothed periphery 114 which meshes with a pinion 115 rigidly secured on a shaft 116 journaled at opposite ends in side walls of the fuselage. The segmental gear 113 as best shown by Fig. 2 is provided at one extremity of its toothed peripheral portion with a pin 117 which projects through an arcuate slot 118 in the side wall of the fuselage concentric to the toothed peripheral portion of the gear, and engages the wing. When the pinion 115 is rotated, the gear 112 and the wing 110 will be turned about the axis of pin 113, and pin 117 connecting one extremity of the gear to a part of the wing will be moved through the slot 118 concentrically to the axis of the pin 112. Each of the wings is further reinforced by means of an inclined strut 120 as best shown by Fig. 3, which is connected to an outer end portion of the wing, and has an inner end extending through the slot 118 and connected to the opposite extremity of the toothed peripheral portion of the gear 113. From this description it is apparent that each of the wings 110 and 111 may be tilted from a substantially horizontal position to a substantially vertical position.

Referring now to Figs. 4 and 5, the shaft 116 is provided with a worm 122 which meshes with a worm 123 secured to a shaft 124 journaled in suitable brackets supported by the fuselage, which for the purposes of clarity are not shown. The upper end of shaft 124 is provided with a bevel gear 125 disposed oppositely to bevel gear 46, which is adapted respectively to mesh with bevel gears 30 and 31. From this description it is apparent that when bevel gear 30 is thrown into mesh with bevel gear 46 and bevel gear 125 that the propeller blades 83 and 84 will be moved vertically into tilted positions and that simultaneously the wings 110 and 111 will be turned from their horizontal positions into approximately vertical positions. Moving the wings in this manner facilitates elevating the airplane.

After the airplane has been elevated sufficiently, propeller blades 83 and 84 are moved downwardly into their lowermost positions, which movement is accompanied by a movement of the wings 110 and 111 to their horizontal positions. Then brake 23 may be released and clutch 20 may be so operated that it connects the propeller 22 to the motor 18. Also clutch 40 may be manipulated in such manner that pinion 36 will be operatively disconnected from shaft 37 thereby causing a cessation of rotation of the horizontally arranged propeller blades 83, 84 and 68.

From the foregoing description it is apparent that an airplane has been provided which may be elevated substantially in a vertical direction without moving the airplane forwardly in flight, and that the airplane may be landed gradually in a substantially vertical direction. The provision of means for stopping the rotation of the vertical propeller facilitates landing of the airplane on a small ground area, and conversely taking off from a small ground area. Moreover, it is apparent that by providing adjustable wings on the fuselage of the airplane, movement of the airplane in a vertical direction will be greatly facilitated. The provision of horizontally arranged propeller blades above the fuselage which rotate in opposite directions, not only increases the lifting power of the elevating mechanism, but also neutralizes, at least substantially, the tendency of one propeller to turn the fuselage. Tilting of the upper set of propeller blades has been found to increase the lifting power of the mechanism considerably. In general the construction provided by the invention constitutes an airplane which may be flown with a great degree of safety principally because it can be landed on and elevated from small ground areas.

Although only one form of the invention has been described and illustrated in detail, it will be apparent to those skilled in the art that various modifications may be made without departing from the scope of the appended claims.

I claim:

1. In an aircraft, a pair of horizontally arranged propellers, axially aligned, means for rotating the propellers relatively and means for tilting the blades of one propeller as to a dihedral angle with respect to the other.

2. In an aircraft, a pair of horizontally arranged propellers axially aligned, means for rotating the propellers relatively, means for tilting the blades of one propeller as to a dihedral angle with respect to the other, and means for independently rendering the rotating and tilting means inoperative.

3. In an aircraft, main wings on the craft, a horizontally arranged propeller, means for tilting the blades of the propeller, and means for tilting the wings, said means being operable in unison.

4. In an aircraft, main wings on the craft, horizontally arranged propellers on the craft, means for rotating the propellers relatively, a vertically arranged propeller on the craft, means for rotating the vertical propeller, means for rendering the last mentioned means inoperative, and means for tilting the wings, all of said means being operatively connected to a common power plant.

5. An airplane comprising a shaft, a propeller on the shaft, means for varying the angle between the shaft axis and the longitudinally extending median line of a propeller blade, and maintaining the blade in any position of angular adjustment, means for rotating the shaft, and means operable by said rotary means for operating the propeller blade angle varying means.

6. An airplane comprising a shaft, a propeller on the shaft, means for varying the angle between the shaft axis and the longitudinally extending median lines of the propeller blades, and maintaining the blades in any position of angular adjustment, and means for rotating the shaft and simultaneously operating said varying means for changing the position of the propeller blades with respect to the shaft axis.

7. An airplane comprising a body having main wings projecting from opposite sides thereof, a shaft, a propeller on the shaft, means for varying the angle between the shaft axis and the longitudinally extending median lines of the propeller blades, and maintaining the blades in any position of angular adjustment, means for rotating the shaft, and means operable simultaneously with the rotatable means for operating said propeller blade angular adjusting means.

8. An airplane comprising a body and main wings projecting from opposite sides thereof, a shaft, a propeller on the shaft, means for varying the angle between the shaft axis and the longitudinally extending median lines of the propeller blades, and maintaining the blades in any position of angular adjustment, means for rotating the shaft, simultaneously operable means for operating the propeller blade varying means and means for varying the position of the wings with respect to the body.

9. An airplane comprising a body having main wings projecting from opposite sides thereof, a shaft, a propeller on the shaft, means for varying the angle between the shaft axes and the longitudinally extending median lines of the propeller blades, and maintaining the blades in any position of angular adjustment, means for adjusting the wings about axes extending transversely of the body, means for rotating the shaft, and simultaneously operable means for operating the blade varying means.

10. An airplane comprising a body having a shaft, a propeller on the shaft, means for varying the angle between the shaft axis and the longitudinally extending median lines of the propeller blades and maintaining the blades in any position of angular adjustment, said means including means extending longitudinally of the shaft and rotatable therewith, and means for rotating the shaft.

11. An airplane comprising a body having a shaft, a propeller on the shaft, means for varying the angle between the shaft axis and the longitudinally extending median lines of the propeller blades and maintaining the blades in any position of angular adjustment, said means including means for moving the propeller along the shaft, and means for rotating said shaft.

12. An airplane comprising a body, a shaft, a propeller on the shaft, means for varying the angle between the shaft axis and the longitudinally extending median lines of the propeller blades, and maintaining the blades in any position of angular adjustment, said means including means for moving the propeller along the shaft, and means for rotating the shaft including means for operating the pair of means first mentioned at will.

13. An airplane comprising a body, a shaft, a pair of propellers on said shaft, means for rotating the propellers relatively, means for varying the angle between the shaft axis and the longitudinally extending median line of the blades on one of the propellers and maintaining the blades in any position of angular adjustment, and means for rotating the shaft.

14. An airplane comprising a body having main wings projecting from opposite sides thereof, means for adjusting the wings about axes extending transversely of the body, a vertically extending shaft, a pair of propellers on said shaft, means for varying the angle between the shaft axis and the longitudinally extending median lines of the blades on one of the propellers and maintaining such blades in any position of angular adjustment, and means for rotating the shaft.

15. An airplane comprising a body, main wings projecting from opposite sides of the body, means for varying the position of the wings about axes extending transversely of the body, a shaft extending vertically of the body, a pair of propellers mounted on the shaft, means for tilting the blades on one of the propellers as to a dihedral angle with respect to the other propeller, and common means for rotating the shaft and so varying the positions of the blades of the one propeller.

16. An airplane comprising a body, a shaft projecting vertically of the body, a pair of horizontally arranged propellers on the shaft, means for rotating such propellers relatively about the shaft axis, means for tilting the blades of one propeller as to a dihedral angle with respect to the other propeller, main wings on the body extending transversely thereof, means for adjusting the wings about axes extending transversely of the body, and means rendering the aforesaid means operable simultaneously.

17. An airplane comprising a body having main wings projecting from opposite sides thereof, means for varying the position of the wings about transversely extending axes, a vertically arranged shaft in the body, a pair of propellers on the shaft and arranged in substantially horizontal planes above the body, means for varying the position of the blades of one propeller as to a dihedral angle with respect to the other propeller, a horizontally arranged shaft in the body, a propeller mounted on said shaft and generally disposed in a vertical plane, means for rotating said shaft, and means for rendering all of the aforesaid means operable simultaneously or alternately as desired.

18. An airplane comprising a shaft, a pair of propellers on the shaft and rotatable about a common axis, means for varying the pitch of the blades on one propeller and means for varying the blades of the other propeller as to a dihedral angle.

19. An airplane comprising a shaft, a pair of propellers on the shaft and rotatable about a common axis, means for varying the pitch of the blades on one propeller, means for varying the blades of the other propeller as to a dihedral angle and means for rotating propellers relatively.

20. An airplane comprising a shaft, a pair of propellers on the shaft, and means for maintaining the blades on one propeller in a position wherein the longitudinal, median lines of the blades are angled with respect to the shaft axis.

LUVERN L. KUETHE.